United States Patent
Braspenning et al.

(10) Patent No.: US 6,985,604 B2
(45) Date of Patent: Jan. 10, 2006

(54) METHOD, SYSTEM AND APPARATUS FOR BLOCK MATCHING BASED ON VISIBLE PIXELS

(75) Inventors: Ralph Antonius Cornelius Braspenning, Eindhoven (NL); Fabian Edgar Ernst, Eindhoven (NL); Cornelius Wilhelmus Antonius Marie Van Overveld, Eindhoven (NL); Piotr Wilinski, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 616 days.

(21) Appl. No.: 09/850,349

(22) Filed: May 7, 2001

(65) Prior Publication Data

US 2002/0009211 A1    Jan. 24, 2002

(30) Foreign Application Priority Data

May 19, 2000   (EP) .................................. 00201773

(51) Int. Cl.
G06K 9/00 (2006.01)
G06K 9/36 (2006.01)
G06K 9/46 (2006.01)
G06K 9/62 (2006.01)
H04N 7/12 (2006.01)
H04N 1/02 (2006.01)
H04N 11/04 (2006.01)

(52) U.S. Cl. ...................... 382/107; 382/236; 382/209; 348/416.1; 348/700; 375/240.16

(58) Field of Classification Search ................ 382/107, 382/209, 219, 220, 221, 254, 154, 236; 375/240.16; 348/699, 416.1, 700
See application file for complete search history.

(56) References Cited

U.S. PATENT DOCUMENTS

| | | | | |
|---|---|---|---|---|
| 4,712,248 A | * | 12/1987 | Hongo ...................... 382/199 |
| 4,825,393 A | * | 4/1989 | Nishiya .................... 702/152 |
| 4,876,728 A | * | 10/1989 | Roth ........................ 382/153 |
| 5,909,251 A | * | 6/1999 | Guichard et al. ......... 348/416.1 |
| 6,075,875 A | * | 6/2000 | Gu ............................ 382/107 |
| 6,496,598 B1 | * | 12/2002 | Harman .................... 382/154 |
| 6,668,082 B1 | * | 12/2003 | Davison et al. ............ 382/190 |

OTHER PUBLICATIONS

Yoshida et al, "Block Matching Motion estimation using Block Integration based on Reliability Metric," 1997, IEEE, pp. 152-155.*

* cited by examiner

Primary Examiner—Joseph Mancus
Assistant Examiner—Shefali Patel

(57) ABSTRACT

In block-based motion or depth estimation, a block is assigned a motion or depth value as a result of minimizing the matching error over a limited set of candidate values. The matching error for each element of the set is obtained by computing the luminosity differences between a block of a first image (10) and an area of a second image (11). It may occur that an object (12) is partially obstructed by another object (15), so that a pixel (14) in the block is not present in the corresponding area, because another pixel (16) overlaps it. The method and system according to the invention determine which pixels are not visible in the second image (11), and compute the matching error over only the visible pixels. An apparatus for adapting a video signal (40) uses the chosen candidate values to create an enhanced version of the video signal (40).

9 Claims, 1 Drawing Sheet

METHOD, SYSTEM AND APPARATUS FOR BLOCK MATCHING BASED ON VISIBLE PIXELS

Figure 1:
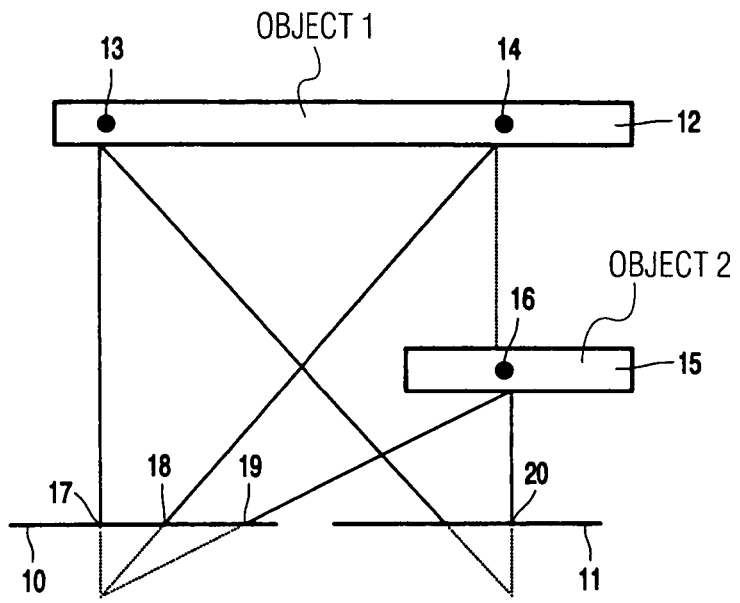

The invention relates to a method of choosing an optimal candidate value to be used for matching a block from a first image with an area from a second image, the method comprising:
(a) making a set of candidate values for determining an area to be matched from the second image,
(b) for each candidate value from the set, determining an area to be matched from the second image, based on said candidate value, matching the block from the first image with this area and calculating a matching error, and
(c) choosing the optimal candidate value from the set based on the calculated matching errors.

The invention likewise relates to a system for choosing an optimal candidate value to be used for matching a block from a first image with an area from a second image, the system comprising:
 a collector, which is arranged for making a set of candidate values for determining an area to be matched from the second image,
 a matcher, which is arranged for determining for each candidate value from the set based on said candidate value an area to be matched from the second image, matching the block from the first image with this area and calculating a matching area, and
 a selector, which is arranged for choosing the optimal candidate value from the set based on the calculated matching errors.

The invention furthermore relates to an apparatus for processing a video signal that comprises a variety of images.

A method of the type defined in the opening paragraph is known from international patent application published under number WO 99/40726 (PHN 17.017) by the same applicants. With block-based techniques for determining motion and depth in an image, the image is divided into a number of blocks, for example, rectangles of equal size. The image may then be compared with another image by matching the individual blocks in the other image.

Matching a block with a second image is effected by choosing a number of candidate values for the motion vector or the depth and then determining for each candidate value in how far the block corresponds to an area in the second image. The degree of deviation in this match may be calculated. This deviation is called the matching error that belongs to the candidate value. The optimal candidate value is the candidate value that has a relatively small matching error. Suitable candidate values are, inter alia, the depths or the motion vectors of adjacent blocks from the first image, because they are likely to have approximately the same characteristics as the present block. Since a block comprises pixels, the matching error may be determined on the basis of the corresponding pixels in the block from the first image and in the area in the second image. A mathematical technique such as determining the mean square error (MSE) is suitable for this purpose.

It may happen that a dot of an object is visible indeed in the first image, but not in the second image. A second object may have such a position that, seen from the second image, the second object partly or in full covers the first object. This means that a block from the first image cannot be completely found back in the second image, because a number of pixels thereof are not visible in the area to be matched.

A disadvantage of the known method is that the matching error is calculated over all the pixels of the block from the first image, also over pixels that are not visible in the area to be matched. These pixels are then compared with pixels corresponding to other dots. If they differ much, for example because brightness varies, this will produce a large matching error. Then it may happen that a candidate value is rejected due to too large a matching error, whereas this candidate value does form the optimal candidate value for the visible area of the block.

It is an object of the invention to provide a method of the type defined in the opening paragraph, in which a better choice for the optimal candidate value is made.

This object is achieved with the method according to the invention in that the block is formed by pixels, a selection is made of pixels of the block from the first image which are visible in the area to be matched from the second image, and the calculation of a matching error is based on said selection. By not using the invisible pixels for the calculation of the matching error, it is avoided that a large matching error occurs owing to mismatching.

In an embodiment of the method the selection is made by determining for the pixels of the block from the first image what their location is in the area to be matched from the second image, and selecting a pixel based on a comparison with other pixels of the block from the first image which are found at the same position in the area to be matched from the second image.

In a further embodiment of the method the comparison is made based on depth. This embodiment is advantageous in that the comparison may now be executed simply and fast.

It is also an object of the invention to provide a system of the type defined in the introductory part, with which a better choice for the optimal candidate value is made.

This object is achieved with the system according to the invention in that the block is formed by pixels, and the matcher is arranged for making a selection of pixels of the block from the first image, which are visible in the area to be matched from the second image, and the matcher is arranged for calculating a matching error based on said selection.

In an embodiment of the system the matcher is arranged for making the selection by determining for the pixels of the block from the first image what position they have in the area to be matched from the second image, and selecting a pixel based on a comparison with other pixels of the block from the first image which have the same position in the area to be matched from the second image.

In a further embodiment of the system the comparison is made based on depth.

It is also an object of the invention to provide an apparatus of the type defined in the introductory part, with which a better processing of the video signal is provided.

This object is achieved with the apparatus in accordance with the invention, in that the apparatus comprises:
 a system according to the invention for choosing an optimal candidate value to be used for matching a block from a first image with an area from a second image, the system being arranged for choosing optimal candidate values for blocks from the images from said variety, and
 an image processor for processing the video signal to obtain an enhanced video signal based on the obtained optimal candidate values as determined by said system.

The image processor enhances the image on the basis of the optimal candidate value that is chosen by a system in accordance with the invention. Since a better choice of the optimal candidate value is made with this system, this will lead to an enhanced image that is better than with other apparatus.

In one embodiment the apparatus further includes a display system for displaying the enhanced video signal.

These and other aspects of the invention are apparent from and will be elucidated with reference to the embodiment(s) described hereinafter.

Figure 2:
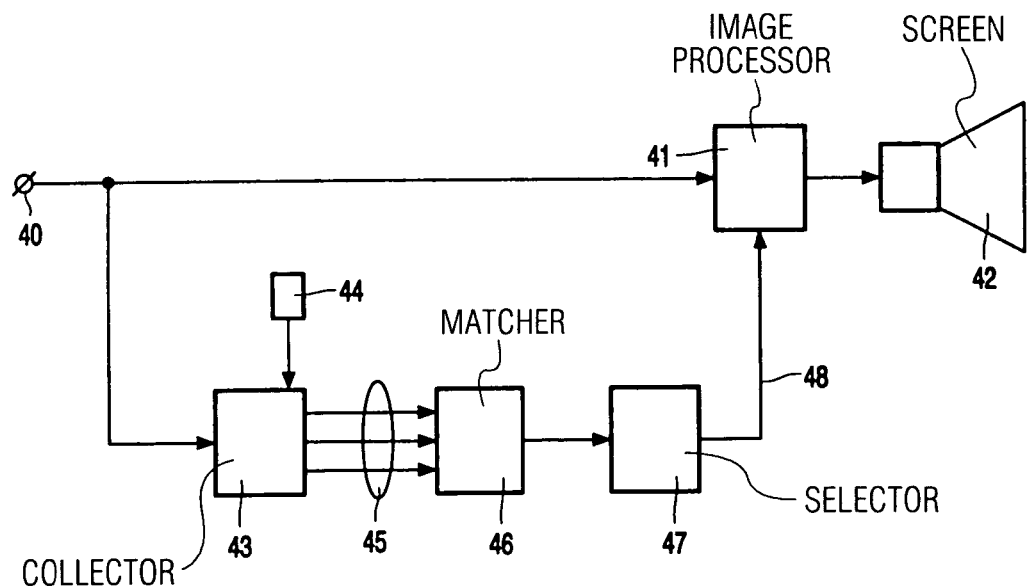

In the drawings:

FIG. 1 is a diagrammatic representation of a plurality of images of a number of objects; and FIG. 2 is a diagrammatic representation of an apparatus according to the invention for processing a video signal.

In block-based techniques for determining motion and depth in a first image, the image is subdivided into a number of blocks. These blocks may be rectangular and of equal size, so that the subdivision may be effected in a simple and fast manner, although it is alternatively possible to utilize arbitrary other shapes. The use of non-rectangular blocks is advantageous in that now arbitrary objects may be covered by a group of blocks, so that motion or depth of such an object can be determined. By subdividing the image into blocks, it is now possible to compare the image with a second image by matching the blocks from the first image with an area from the second image. If the blocks are chosen sufficiently small, there may be assumed that each block moves uniformly and that the depth in a block is the same everywhere. It is then possible to look for an area from the second image that corresponds to a block from the first image. If this is found, the shift of this block in between the two images may be determined and thus the motion of this block. If the two images both relate to a still object, this provides the information that is necessary for determining the depth of this object.

Rarely will it happen that a block from the first image fully matches an area from the second image. This problem is solved by determining, on the basis of the candidate value for the depth or for the motion vector, where the block from the first image would have to be situated in the second image. Subsequently, the area from the second image corresponding to this is matched with the first block and the degree of deviation of the match may be calculated. This deviation is called the matching error of the candidate value. The optimal candidate value is the candidate value having a relatively small matching error, preferably the smallest matching error.

Since a block consists of pixels, the matching error may be determined on the basis of the corresponding pixels in the two blocks. A mathematical technique such as determining the mean square error (MSE) is suitable for this purpose. With this technique the matching error for a motion vector (dx, dy) can be calculated as follows:

$$MSE(i, j) = \sum_{m=1}^{M} \sum_{n=1}^{N} [U_1(m, n) - U_0(m + dx, n + dy)]^2$$

Herein M and N are the dimensions of the block in pixels and $U_i(m, n)$ is the pixel intensity in image i at location (m, n). Calculating the matching error for a depth d takes place in similar manner.

Another suitable mathematical technique is calculating the sum of absolute differences (SAD). The matching error for a depth d may be calculated herewith as follows:

$$SAD(d) = \sum_{(x,y) \in B} |U_1(x + \Delta x(d), y + \Delta y(d)) - U_0(x, y)|$$

Herein, (x, y) is a pixel in a block B and $\Delta x(d)$ is the change of x based on the candidate value for the depth d.

In addition to the mean square error and the sum of absolute differences, also other mathematical techniques, such as the mean absolute difference or the sum of square errors may be used for calculating the matching error of a candidate value for the depth or for a motion vector.

For practical reasons, inter alia, because there is only little time to process a separate image during video signal processing, usually a set of a limited number of candidate values is made, which are subsequently used, as described above, for determining an area from the second image, after which the block from the first image is matched therewith. It is common practice that the values for the depth or the found motion vector of adjacent other blocks are chosen, possibly added by a random value or a previously calculated value for the depth or the motion vector for this block. After the matching errors of the elements of the set have been calculated, the optimal candidate value is chosen as the candidate value having the smallest matching error.

The steps of making the set, calculating the matching errors of the elements of this set and choosing the optimal candidate value may be executed as three separate steps, but also in combination. For each chosen candidate value the matching error may be calculated directly, for example, after which this matching error can be compared with a "running minimum". If a matching error that has just been calculated turns out to be smaller than this running minimum, the current candidate value is chosen as a provisional optimal candidate value and its matching error as a new running minimum. After all the candidate values in the set have been chosen, the thus determined provisional optimal candidate value now becomes the real optimal candidate value.

The method described above may be repeated a number of times to come to the best possible choice of the optimal candidate value. In the case where the depth in the image is determined, initially the depths are chosen at random. With each repetition the values of adjacent blocks are used then, which values may be different from the values of the previous repetition. The newly found value having the smallest matching error is subsequently used for calculating the matching error of other blocks. When the values no longer change, the final value is determined and repetitions may be stopped. With each repetition, the current value for the optimal candidate value and the matching error are to be saved for each block.

FIG. 1 shows a first image 10 and a second image 11, both containing a representation of a first object 12 and a second object 15. Dots of the objects 12 and 15 are visible as pixels in the first image 10 or second image 11. The degree of visibility is also affected by the depth of the objects, seen by a viewer watching the first image 10 or the second image 11. A dot 13 in the object 12 is visible in the first image 10 and in the second image 11. However, a dot 14 of the object 12 is only visible in the first image 10 because, as seen from the second image 11, a dot 16 of the object 15 coincides with this dot 14 in the second image 11.

Now if a block from the first image 10 is to be matched with an area from the second image 11, the dot 14, which is assumed to have a position in the block of the first image, will not be retraceable in the area of the second image 11. A block consists of pixels which correspond to dots of the objects which are visible in the image. Matching a block from the first image 10 with an area from the second image 11 is effected by determining what the corresponding pixels are in the block of the first image 10 and in the area in the second image 11.

If in FIG. 1 a pixel 18 of the block from the first image 10 is matched, which pixel corresponds with dot 14, the intention is that this pixel is matched with a pixel corresponding with dot 14 of an area from the second image 11. This pixel should be pixel 20. However, in the second image 11 the dot 16 is also visible. A pixel corresponding to dot 16 is pixel 20. Since the dot 16 has a smaller distance than the dot 14, seen from the second image 11, pixel 20 corresponds to the dot 16 and dot 14 is thus not visible.

When a block from the first image 10 is matched with an area from the second image 11, the pixel 18 of the block from the first image 10, which pixel corresponds with dot 14, will be matched with the pixel 20 of the area from the second image 11, which pixel corresponds with dot 16. If they are very different, for example because the dot 14 is dark, whereas dot 16 is bright, the result will be a large matching error.

In the method according to the invention a selection is made of pixels of the block from the first image 10, which are visible in the area to be matched from the second image 11. Then the matching error is calculated based on this selection. Since the pixel corresponding to dot 14 is visible in the block from the first image 10, but not in the area to be matched from the second image 11, this pixel is not selected and thus the matching error is calculated while this dot 14 is discarded.

To enable this, the calculation of the matching error as given above is adapted by introducing a function v(x,y), which produces the value 1 if a dot corresponding to pixel (x,y) is visible in the first image 10 in the area to be matched from the second image 11, and otherwise the value 0. The calculation of the matching error by means of, for example, the mathematical technique for calculating the sum of absolute differences (SAD) is then made as follows:

$$SAD(d) = \sum_{(x,y) \in B} v(x,y) |U_1(x + \Delta x(d), y + \Delta y(d)) - U_0(x,y)|$$

where v(x,y) is the function given above. This function is also called visibility map. For other mathematical techniques a comparable modification can be realized in a simple manner.

The matching error of a block B is calculated over all the dots (x,y) of that block B. For each dot (x,y) the difference in the first and second images 10, 11 is calculated. By multiplying this difference by the value of the visibility map for that dot (x,y), the matching error is only calculated over the dots (x,y) where the visibility map shows the value 1.

To determine the visibility map, there is determined for the pixels of the block from the first image 10, what positions they have in the area to be matched from the second image 11. First there is determined to which dot in the three-dimensional space each pixel corresponds. In the example of FIG. 1 there is determined for pixel 17 that it corresponds to dot 13, for pixel 18 that this one corresponds to dot 14 and for pixel 19 that this pixel corresponds to dot 16.

Based on, for example, the determined candidate value, the positions of these pixels in the second image 11 are determined. For this purpose, a previously determined candidate value for the depth or motion vector can be used, for example. The method of choosing an optimal candidate value may be applied first without a modification of the function for calculating the matching error, so that an optimal candidate value is determined. For dot 14 and dot 16 it now turns out they have the same position in the area to be matched from the second image 11, that is, pixel 20.

By comparing the pixels 18 and 19, or the dots 14 and 16 corresponding therewith, there can be determined which of these pixels or dots is visible in the area to be matched. This comparison may preferably be made based on depth, because, usually, the nearest dot will be visible because it covers more remote dots. A remote pixel 11, however, may also be so much brighter than pixels lying closer, that the remote pixel is nevertheless visible. A pixel lying nearby may be transparent, so that more remote pixels are visible in lieu of the near pixel. In FIG. 1 it appears that dot 16 lies nearer than dot 14, seen from the second image 11, and therefore dot 16 is selected. The selection is then established by setting the value of the visibility map for pixel 19 to 1, and for pixel 18 to zero.

The candidate values for the depth or motion vectors may also be considered stochastic variables having a certain function for the probability density function, in lieu of deterministic values. In that case, the approach described above is slightly changed. The probability density function of the depth or motion is determined, for example, by implementing the method as described above, without modifying the function for calculating the matching error. Subsequently, there is determined with what dot in the three-dimensional space each pixel most likely corresponds. Based on, for example, the candidate value found, there is determined for these dots what position they have in the second image 11. Then for each pixel the probability that the pixel is visible in the second image 11 is calculated, for example, with depth as a criterion. The selection is now made based on this probability. A pixel having the highest probability of being visible is now selected.

This selection may be laid down in the visibility map. A first possibility is to set the value of a pixel to 1 when this pixel has the highest probability and otherwise to 0. The second possibility is to include the probability of the pixel being visible in the visibility map.

When the method is executed several times, no information is available yet in the first iteration for determining with what dots the pixels of the block from the first image 10 correspond. Therefore, the value of the visibility map in this iteration can be set to 1 for all pixels.

FIG. 2 represents an apparatus for processing a video signal 40, which video signal 40 comprises a variety of images. The apparatus comprises an image processor 41, which is arranged for processing the video signal 40 to obtain an enhanced video signal. This enhanced video signal is then displayed on a display screen 42. Although FIG. 2 shows the display screen 42 as part of the same apparatus that includes the image processor 41, it may be clear that the display screen 42 may also be arranged independently of the apparatus and can receive the enhanced video signal from the apparatus via a network.

The image processor 41 can enhance the video signal 40 based on information about the motion or depth of individual images in the video signal 40. For example, it is possible for the image processor 41 to process the video signal 40, so that a user can watch the image from another angle by separately rotating, based on depth information, individual objects determined by a group of blocks, and thus generating a correct reproduction from another angle. This may provide, for example, a stereoscopic reproduction. Motion information may be used for detecting and marking moving objects, for example, to be used for automatic surveillance cameras. The thus obtained video signal with marked objects provides an enhancement for the user of these cameras, because they can now detect the image changes much faster.

In another possible application the image processor 41 enhances the video signal 40 which is offered, for example, in a compressed format such as MPEG, by producing a video signal that is compressed more efficiently. An individual object determined via a group of blocks, which object occurs in a number of images in the video signal 40, may now be compressed by storing pixel information about the object once-only and storing only the motion vector or depth information of this object for other images this object occurs in. Since this information requires less storage capacity than the pixel information of the complete object, a method such as this one can provide a considerably enhanced compressed video signal.

For clarity, the explanation below is about the function of elements of the system only when a first block depth is determined, but it may be clear from the above that the movement of a first block can be determined in similar manner.

The apparatus further includes a collector 43, a matcher 46 and a selector 47. The collector 43 is arranged for making a set 45 of candidate values for determining an area to be matched from the second image. The set 45 made by the collector 43 includes, inter alia, previously determined depths of blocks adjacent to the first block. The depths of adjacent blocks will generally show little mutual difference. The depths of blocks adjacent to the first block therefore form a good starting point for determining the depth of the first block and are therefore used as candidate values for this depth. To this end there is a storage system 44 on which this depth and other previously determined depths can be stored, so that the collector 43 can use them when making the set 45 of candidate values.

The collector 43 sends the set 45 of candidate values on to a matcher 46. The matcher 46 determines for each candidate value from the set, on the basis of said candidate value, an area to be matched from the second image. Subsequently, the matcher 46 matches the block from the first image with this area and the matcher 46 calculates an associated matching area, as is described above. For this purpose, methods mentioned earlier may be implemented, such as the mean square error, the mean absolute difference, the sum of absolute differences or the sum of square errors.

The matcher 46 in this embodiment is arranged for making a selection of pixels of the block from the first image, which are visible in the area to be matched from the second image. It may be evident that also another portion of the apparatus can be arranged for this task.

The matcher 46 makes the selection by determining for the pixels of the block from the first image what position they have in the area to be matched from the second image. Subsequently, the matcher 46 compares the pixels that have the same position in the matched area from the second image, or the dots corresponding therewith. So doing, the matcher 46 can determine which of these pixels or dots is visible in the area to be matched. This comparison may preferably be made based on depth, because mostly the nearest dot is visible, because it covers dots that are more remote. The selection is then made by setting the value of the visibility map for a visible pixel to 1, and for the non-visible pixel or pixels to 0. The matcher 46 calculates the matching error based on the visibility map, as described with reference to FIG. 1.

After the matching errors of the candidate values from the set 45 have been calculated, a selector 47 chooses the optimal candidate value 48 from the set 45 on the basis of the calculated matching errors. The optimal candidate value 48 is the candidate value having a relatively low matching error. The selector 47 then sends the optimal candidate value 48 to the image processor 41. Repeating this procedure for various blocks from an image provides depth information for this image. Based on the thus provided depth information, the image processor 41 can process the video signal 40 to obtain an enhanced video signal. This enhanced video signal may then be displayed on the display screen 42.

What is claimed is:

1. A method of choosing an optimal candidate value to be used for matching a block from a first image (10) with an area from a second image (11), the method comprising: (a) making a set of candidate values for determining an area to be matched from the second image (11), (b) for each candidate value from the set, determining an area to be matched from the second image (11), based on said candidate value, matching the block from the first image (10) with this area and calculating a matching error, and (c) choosing the optimal candidate value from the set based on the calculated matching errors, characterized in that the block is formed by pixels, a selection is made of pixels of the block from the first image which are not visibly occluded in the area to be matched from the second image (11), and the calculation of a matching error excludes from the calculation said pixels of the block that are visibly occluded.

2. A method as claimed in claim 1, wherein the selection is made by determining for the pixels of the block from the first image (10) what their location is in the area to be matched from the second image (11), and selecting a pixel based on a comparison with other pixels of the block from the first image (10) which are found at the same position in the area to be matched from the second image (11).

3. A method as claimed in claim 2, wherein said comparison is made based on depth, of the pixels to be compared, in their respective images.

4. A system for choosing an optimal candidate value to be used for matching a block from a first image with an area from a second image, the system comprising: a collector (43), which is arranged for making a set (45) of candidate values (20, 21, 22, 23) for determining an area to be matched from the second image, a matcher (46), which is arranged for determining for each candidate value from the set based on said candidate value an area to be matched from the second image, matching the block from the first image with this area and calculating a matching error, and a selector (47), which is arranged for choosing the optimal candidate value from the set (45) based on the calculated matching errors (24), characterized in that the block is formed by pixels, and the matcher (46) is arranged for making a selection of pixels of the block from the first image, which are not visibly occluded in the area to be matched from the second image, and the matcher (46) is arranged for calculating a matching error, said pixels of the block that are visibly occluded being excluded from the calculation.

5. A system as claimed in claim 4, wherein the matcher (46) is arranged for making the selection by determining for the pixels of the block from the first image what position they have in the area to be matched from the second image, and selecting a pixel based on a comparison with other pixels of the block from the first image which have the same position in the area to be matched from the second image.

6. A system as claimed in claim 4, wherein said comparison is made based on depth, of the pixels to be compared, in their respective images.

7. An apparatus for processing a video signal (40) that consists of a variety of images, comprising: a system (43, 46, 47), comprising: a collector (43), which is arranged for making a set (45) of candidate values (20, 21, 22, 23) for determining an area to be matched from the second image, a matcher (46), which is arranged for determining for each candidate value from the set based on said candidate value an area to be matched from the second image, matching the block from the first image with this area and calculating a matching error, and a selector (47), which is arranged for choosing the optimal candidate value from the set (45) based on the calculated matching errors (24), characterized in that the block is formed by pixels, and the matcher (46) is arranged for making a selection of pixels of the block from the first image, which are not visibly occluded in the area to be matched from the second image, and the matcher (46) is arranged for calculating a matching error, said pixels of the block that are visibly occluded being excluded from the calculation, and an image processor (41) for processing the video signal (40) to obtain an enhanced video signal based on the obtained optimal candidate values as determined by said system (43, 46, 47).

8. An apparatus as claimed in claim 7, wherein the apparatus further includes a display system (42) for displaying the enhanced video signal.

9. A method of choosing an optimal candidate value to be used for matching a block from a first image (10) with an area from a second image (11), the method comprising: (a) making a set of candidate values for determining an area to be matched from the second image (11), (b) for each candidate value from the set, determining an area to be matched from the second image (11), based on said candidate value, matching the block from the first image (10) with this area and calculating a matching error, and (c) choosing the optimal candidate value from the set based on the calculated matching errors, characterized in that the block is formed by pixels, a selection is made of pixels of the block from the first image which are not visibly occluded in the area to be matched from the second image (11), and the calculation of a matching error is based on said selection, wherein the selection is made by determining for the pixels of the block from the first image (10) what their location is in the area to be matched from the second image (11), and excluding a pixel from the first image (10) which is found at the same position in the second image (11).

* * * * *